US011642726B2

(12) United States Patent
Suzuki

(10) Patent No.: US 11,642,726 B2
(45) Date of Patent: May 9, 2023

(54) CUTTING TOOL AND CUTTING INSERT

(71) Applicant: TUNGALOY CORPORATION, Fukushima (JP)

(72) Inventor: Yusuke Suzuki, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 0 days.

(21) Appl. No.: 17/582,413

(22) Filed: Jan. 24, 2022

(65) Prior Publication Data

US 2022/0258252 A1 Aug. 18, 2022

(30) Foreign Application Priority Data

Feb. 18, 2021 (JP) .............................. JP2021-023879

(51) Int. Cl.
*B23B 27/16* (2006.01)
*B23B 27/22* (2006.01)
*B23B 27/08* (2006.01)

(52) U.S. Cl.
CPC .......... *B23B 27/08* (2013.01); *B23B 27/1622* (2013.01); *B23B 2200/0447* (2013.01); *B23B 2200/083* (2013.01); *B23B 2200/321* (2013.01); *B23B 2200/3618* (2013.01)

(58) Field of Classification Search
CPC ................ B27B 27/08; B27B 27/1622; B27B 2200/0447; B23B 2200/083; B23B 2200/321; B23B 2200/3618; B23B 27/1614; B23B 27/16; B23B 27/22;

(Continued)

(56) References Cited

U.S. PATENT DOCUMENTS 5,137,396 A * 8/1992 Durschinger ......... B23B 27/045
407/116
5,156,502 A 10/1992 Satran
(Continued)

FOREIGN PATENT DOCUMENTS

JP H03-142102 A 6/1991
JP 2017193001 A * 10/2017
(Continued)

*Primary Examiner* — Sara Addisu
(74) *Attorney, Agent, or Firm* — Studebaker & Brackett PC

(57) ABSTRACT

Provided is a cutting insert having two cutting parts that is capable of entering a workpiece more deeply and easily supports machining of a groove or hole having a small diameter in a workpiece. A cutting insert includes: a body having at least an inner surface to be fixed to a tool body of a cutting tool and an outer surface opposed to the inner surface; and two cutting parts protruding in opposite directions in a longitudinal direction of the body. The cutting part includes: a cutting upper surface; a cutting front surface; and a first cutting side surface and a second cutting side surface. A front cutting edge is located on an edge between the cutting upper surface and the cutting front surface. In a projection view of the body as seen from the longitudinal direction, the cutting upper surfaces of the two cutting parts are oriented in directions opposed to each other, and front cutting edges of the two cutting parts are disposed so as to be more away from each other as being closer to the first cutting side surface from the second cutting side surface.

14 Claims, 10 Drawing Sheets

(58) Field of Classification Search
CPC ... B23B 27/141; B23B 27/045; B23B 27/143; B23B 2200/081; B23B 2200/087
See application file for complete search history.

(56) References Cited

U.S. PATENT DOCUMENTS

| | | | |
|---|---|---|---|
| 7,883,300 B1* | 2/2011 | Simpson, III | B23B 27/045 |
| | | | 407/115 |
| 9,114,460 B2* | 8/2015 | Nisikawa | B23B 51/0054 |
| 11,565,328 B2* | 1/2023 | Fukuhara | B23B 27/1611 |
| 2009/0142149 A1 | 6/2009 | Niemi et al. | |
| 2017/0266732 A1 | 9/2017 | Andoh et al. | |
| 2021/0260669 A1* | 8/2021 | Fukuhara | B23B 27/1614 |
| 2022/0134444 A1* | 5/2022 | Schmidt | B23B 27/08 |
| | | | 407/30 |

FOREIGN PATENT DOCUMENTS

| | | | | |
|---|---|---|---|---|
| JP | 2021007991 A * | 1/2021 | | |
| WO | 2013/151137 A1 | 10/2013 | | |
| WO | 2016/067547 A1 | 5/2016 | | |
| WO | WO-2020009002 A1 * | 1/2020 | | B23B 1/00 |

* cited by examiner

Fig. 4
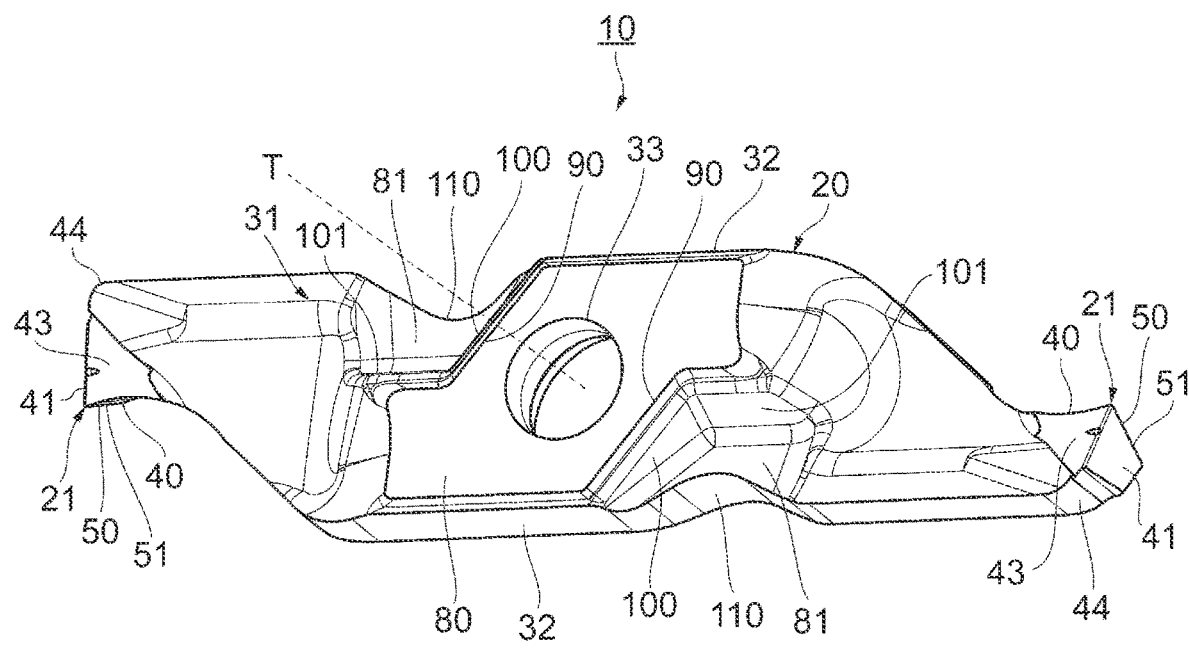
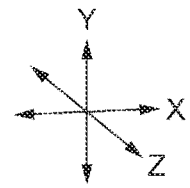

Fig. 5
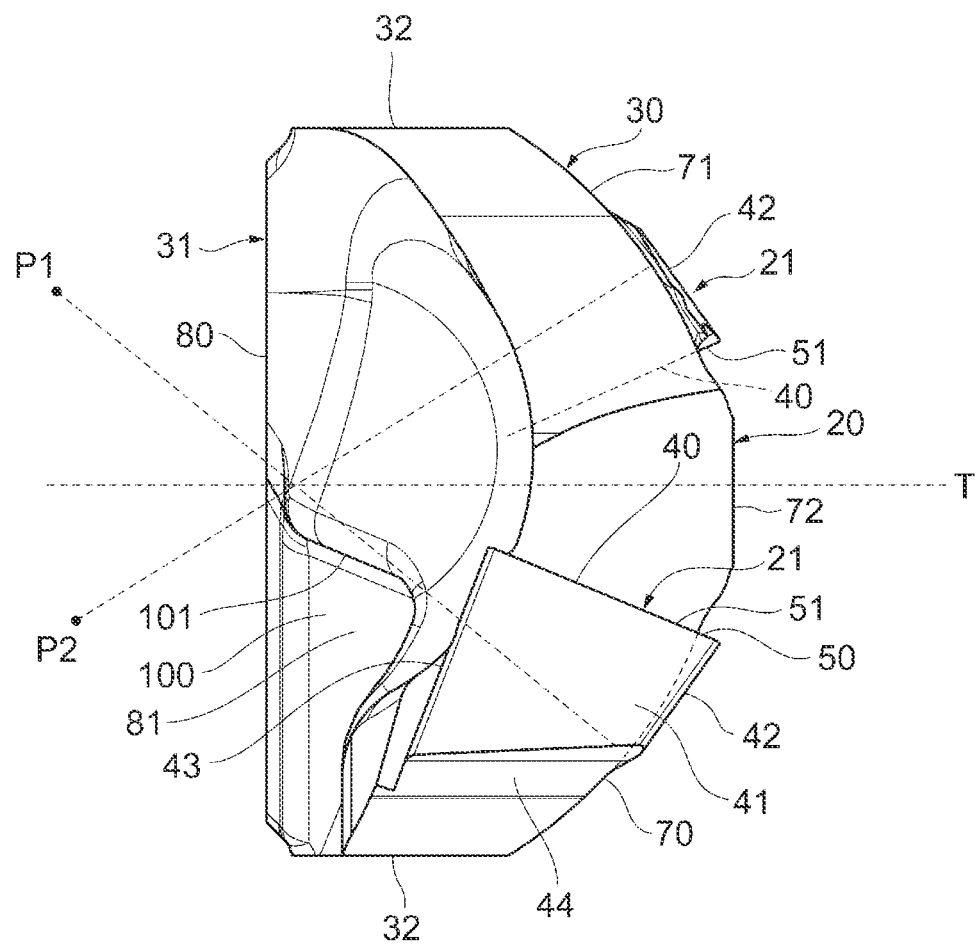
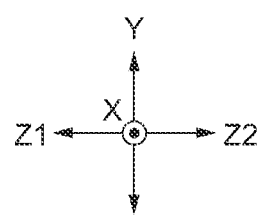

CUTTING TOOL AND CUTTING INSERT

BACKGROUND

Field

The present invention relates to a cutting tool and a cutting insert.

Description of Related Art

As a cutting insert for turning a workpiece and forming a groove in an end surface of the workpiece, the one having a body which is elongated in one direction and which has a cutting part at a leading end of the body in a longitudinal direction is used. Some cutting inserts of this type have two cutting parts provided at both ends of the body in the longitudinal direction (see Patent Publication JP-A-H03-142102). In such a cutting insert, even when one of the cutting parts has worn, the other cutting part can be used.

The above-mentioned cutting insert is used by being held by a tool body of a cutting tool. In a cutting insert having two cutting parts, one of the cutting parts to be used is oriented toward the leading end of the tool body, and a peripheral part of the other cutting part not in use is fixed to the tool body. In the above-mentioned cutting insert, there is a large limitation on a distance of the entering of the cutting insert in a workpiece when the cutting insert forms a groove in an end surface of the workpiece, in order for a cutting part not in use or a tool body holding a peripheral part of the cutting part not in use to avoid the interference with the workpiece. If the diameter of a groove or a hole in an end surface of the workpiece, the peripheral part of the cutting part not in use or the tool body contacts a wall surface of the groove or the hole in the workpiece, and hence such a cutting insert cannot sufficiently support machining of a workpiece with a small diameter of a groove or a hole.

SUMMARY

The present invention has been made in view of the above, and it is an object thereof to provide a cutting insert having two cutting parts that can enter a workpiece more deeply and that can easily support machining of a groove or hole having a diameter in a workpiece, and a cutting tool.

A cutting insert according to one aspect of the present invention includes: a body including at least an inner surface to be fixed to a tool body of a cutting tool and an outer surface opposed to the inner surface, the body being elongated in one direction in a planar direction of the inner surface and the outer surface; and two cutting parts protruding in opposite directions in a longitudinal direction of the body, in which each of the cutting parts has a substantially prism shape, and includes: a cutting upper surface serving as a rake surface; a cutting front surface located on a front surface side of the cutting upper surface and forming a connecting edge between the cutting front surface and the cutting upper surface; and a first cutting side surface and a second cutting side surface located on both sides of the cutting upper surface, the second cutting side surface is disposed on an inner surface side of the body, and the first cutting side surface is disposed on an outer surface side of the body, the connecting edge between the cutting upper surface and the cutting front surface has a front cutting edge formed thereon, and in a projection view of the body as seen from the longitudinal direction, the cutting upper surfaces of the two cutting parts are oriented in directions opposed to each other, and the two cutting parts have front cutting edges disposed so as to be more away from each other as being closer to the first cutting side surface from the second cutting side surface.

According to the above-mentioned aspect, the cutting insert having two cutting parts can enter a workpiece more deeply, and easily supports machining of a groove or hole having a small diameter in a workpiece.

In the above-mentioned aspect, the inner surface may include a fixing surface for fixing the body to the tool body of the cutting tool, and in the projection view of the body as seen from the longitudinal direction, an intersection obtained by extending the two front cutting edges on the inner surface side may be located at a position closer to the outer surface than the fixing surface of the inner surface.

In the above-mentioned aspect, in the projection view of the body as seen from the longitudinal direction, the two front cutting edges may be disposed on both sides of a virtual center line passing through a center of the body in a lateral direction and extending in a thickness direction perpendicular to the lateral direction.

In the above-mentioned aspect, in the projection view of the body as seen from the longitudinal direction, a first front cutting edge of the two front cutting edges may be disposed such that an axial center of the tool body of the cutting tool is located on a first virtual extended line obtained by extending the first front cutting edge.

In the above-mentioned aspect, in the projection view of the body as seen from the longitudinal direction, a virtual intersection that intersects a second virtual extended line obtained by extending a second front cutting edge of the two front cutting edges may be located on the first virtual extended line, and the virtual intersection may be located at a position closer to the first front cutting edge than the axial center of the tool body.

In the above-mentioned aspect, the outer surface may include: a first side surface part including the first cutting side surface of one of the cutting parts and provided to extend in the longitudinal direction; a second side surface part including the first cutting side surface of the other cutting part and provided to extend in the longitudinal direction; and a third side surface part disposed between the first side surface part and the second side surface part and connecting the first side surface part and the second side surface part to each other, and the first side surface part and the second side surface part may each have a curved surface that is curved along a lateral direction of the body so as to project outward.

In the above-mentioned aspect, in the plan view of the body as seen from the longitudinal direction, centers of the curved surfaces of the first side surface part and the second side surface part are not necessarily required to match each other.

In the above-mentioned aspect, the third side surface part may include a flat surface.

In the above-mentioned aspect, the third side surface part may have a screw hole opened therein.

In the above-mentioned aspect, the inner surface may include a fixing surface for fixing the body to the tool body of the cutting tool, and the inner surface may include a recessed part that is recessed with respect to the fixing surface.

In the above-mentioned aspect, in the plan view of the body as seen from the longitudinal direction, the recessed part may include a wall surface substantially parallel to the cutting upper surface of the cutting part.

In the above-mentioned aspect, the body may further include side end surfaces located on both sides of the body in the lateral direction and connecting the outer surface and the inner surface to each other, and the side end surface may have a recess that is recessed toward a center of the body in the lateral direction.

In the above-mentioned aspect, in a plan view of the body as seen from the outer surface, in a case where the body is divided into halves by a center line passing through a center of the body and extending in a lateral direction of the body and one half-body of the body is rotated by 180 degrees around the center of the body, the one half-body may match the other half-body.

A cutting tool according to one aspect of the present invention includes: the above-mentioned cutting insert; and a tool body to which the cutting insert is fixed.

BRIEF DESCRIPTION OF DRAWINGS

FIG. 4 is a perspective view of the cutting insert as seen from an inner surface side of the cutting insert;

FIG. 5 is a plan view of the cutting insert as seen from a longitudinal direction of the cutting insert;

DETAILED DESCRIPTION

Figure 1:
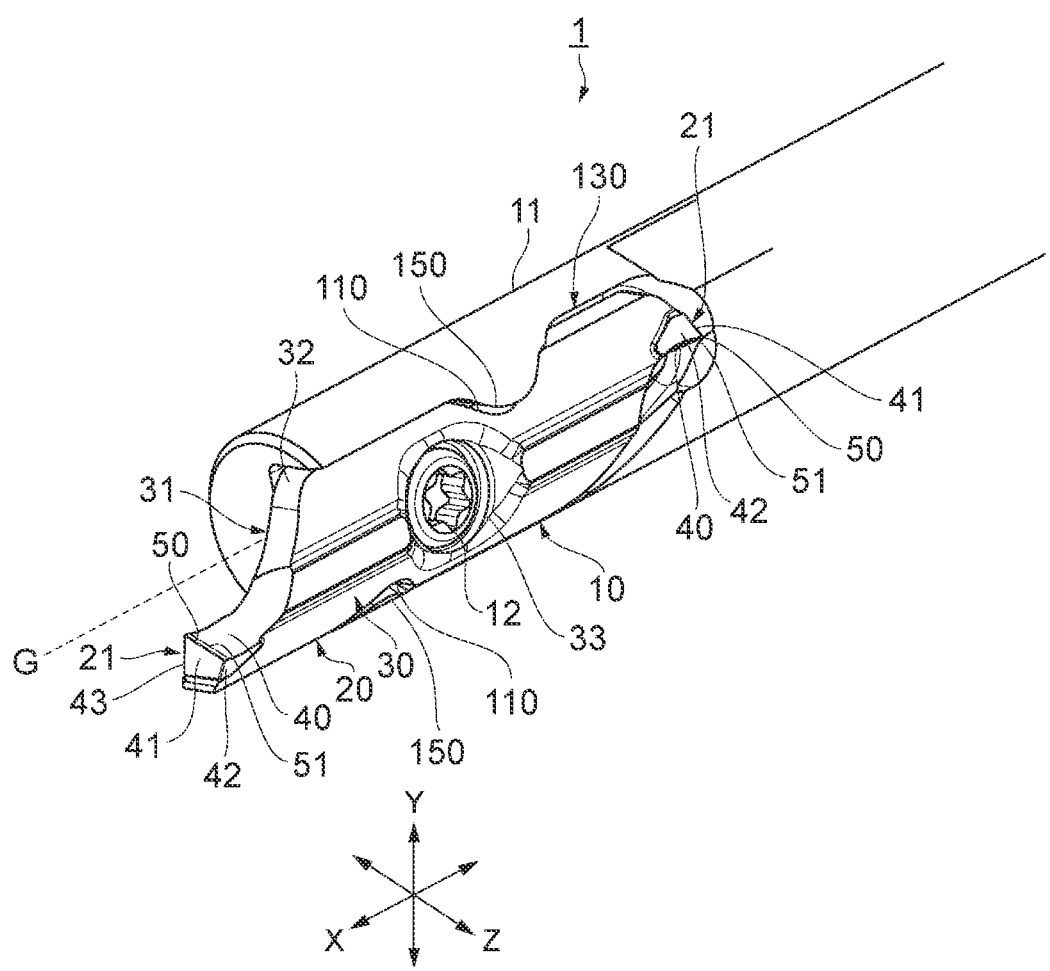
FIG. 1 is a perspective view illustrating an example of a cutting tool according to the present embodiment.

Referring to the drawings, exemplary embodiments of the present invention are described below.

Figure 2:
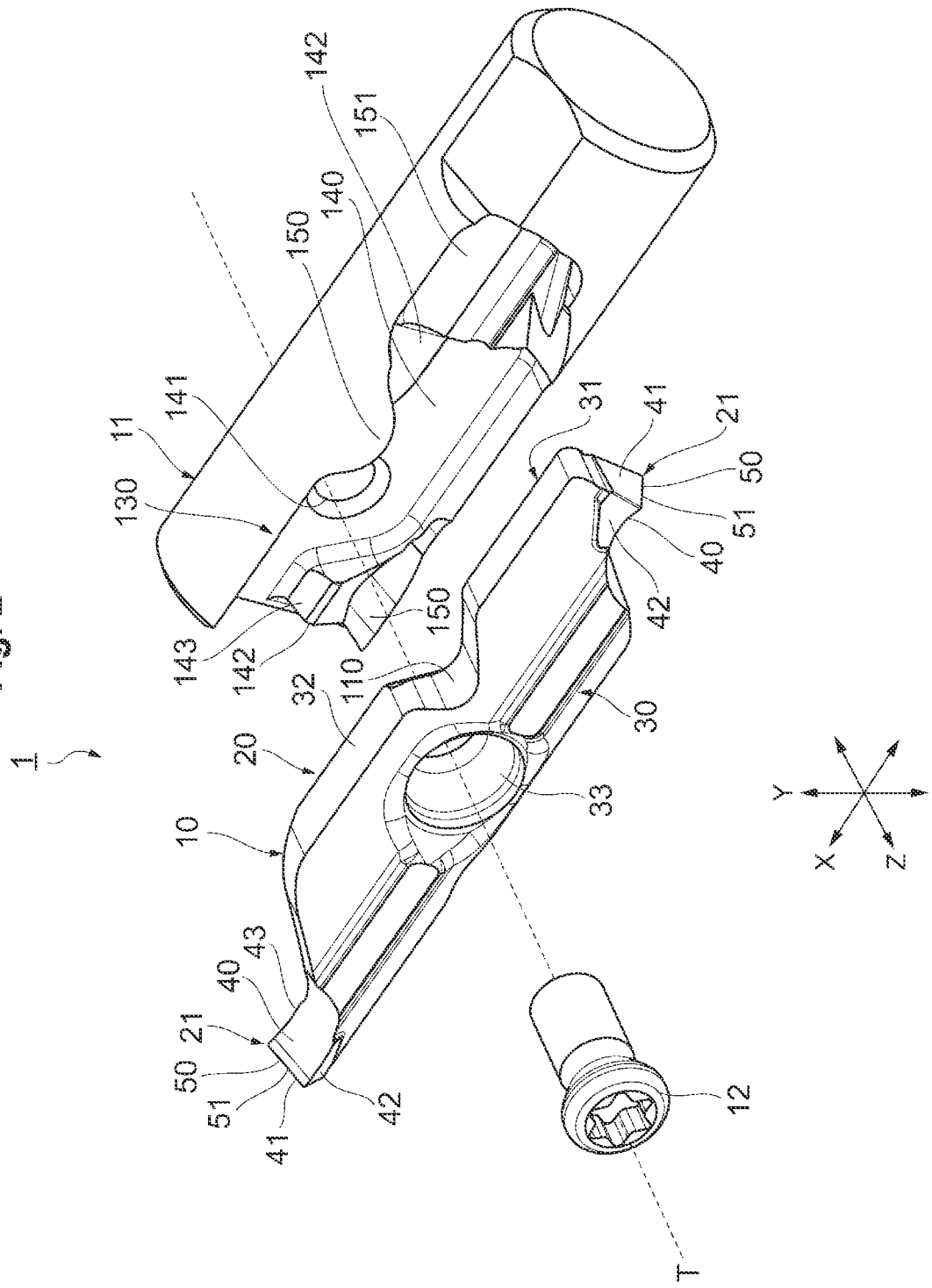
FIG. 2 is an exploded view of the cutting tool.

FIG. 1 is a perspective view illustrating an example of a cutting tool 1 according to the present embodiment, and FIG. 2 is an exploded view of the cutting tool 1. The cutting tool 1 is, for example, an edge replaceable turning tool. The cutting tool 1 includes a cutting insert 10 and a tool body (holder) 11 to which the cutting insert 10 is fixed. The cutting insert 10 is fixed to the tool body 11 with a screw 12.

Figure 3:
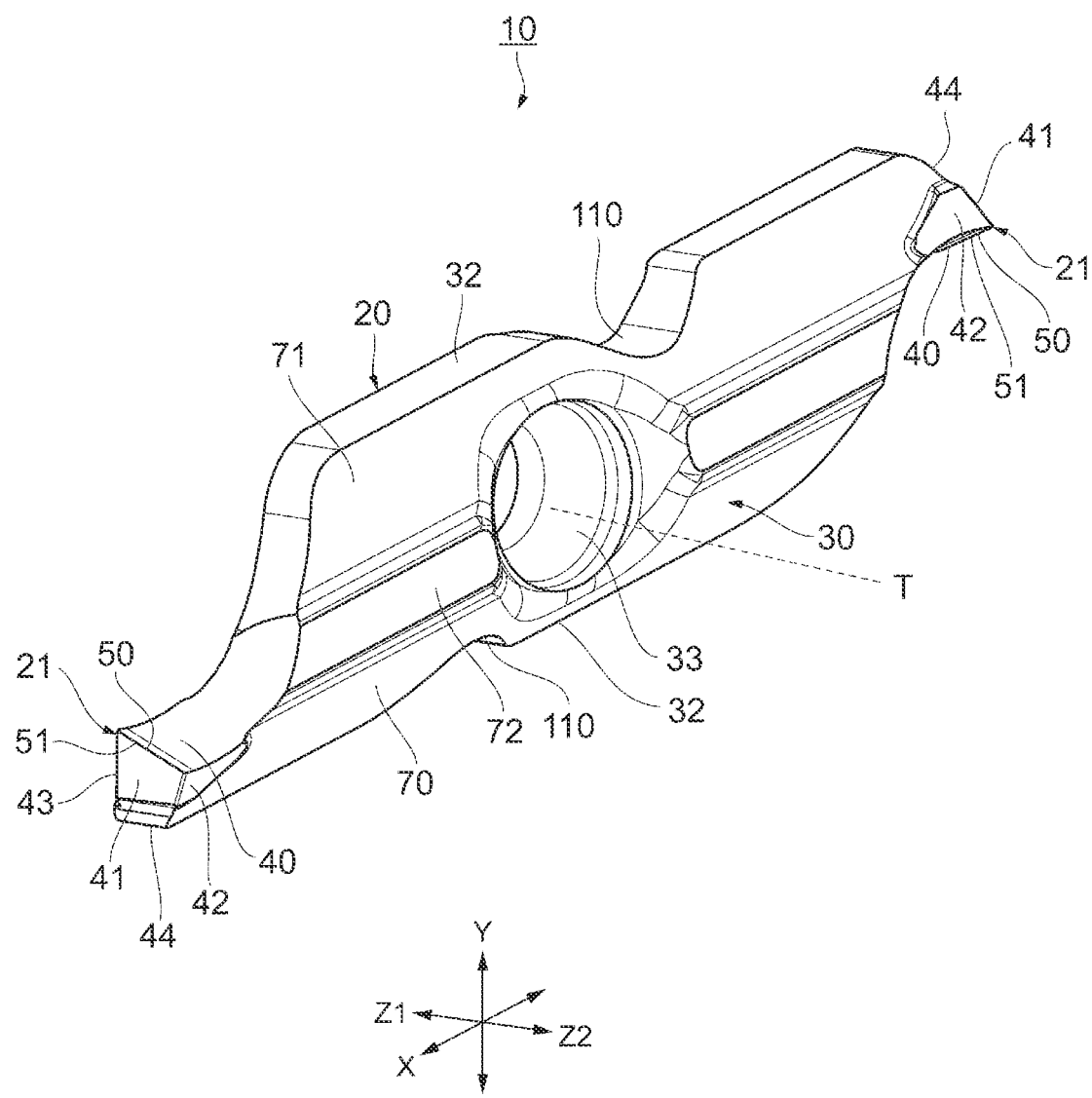
FIG. 3 is a perspective view of a cutting insert as seen from an outer surface side of the cutting insert.
Figure 6:
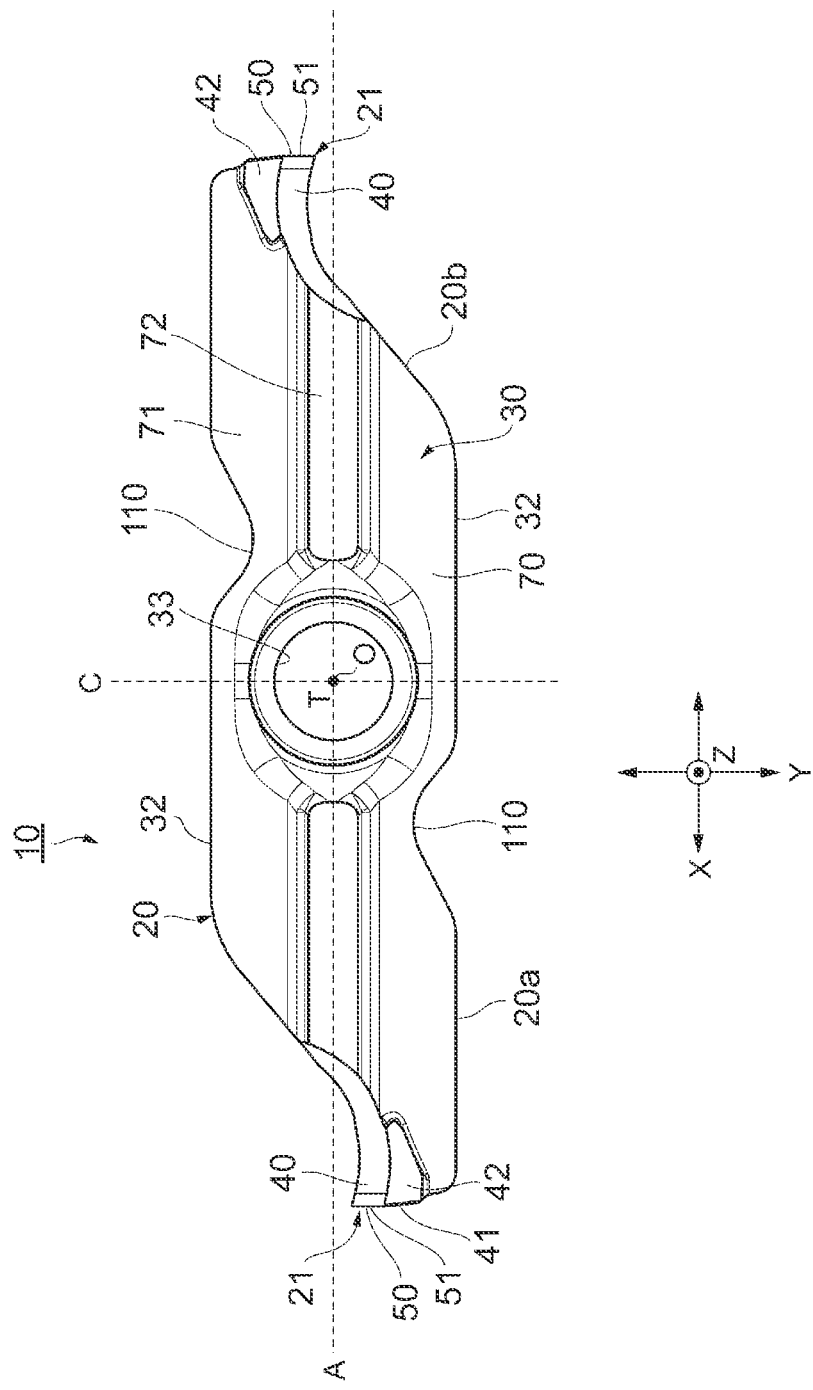
FIG. 6 is a plan view of the cutting insert as seen from the outer surface side of the cutting insert.

FIG. 3 is a perspective view of the cutting insert 10 as seen from the outer surface side thereof, and FIG. 4 is a perspective view of the cutting insert 10 as seen from the inner surface side thereof. FIG. 5 is a plan view of the cutting insert 10 as seen from a longitudinal direction X. FIG. 6 is a plan view of the cutting insert 10 as seen from the outer surface side thereof. In this specification, the longitudinal direction X is a direction in which a centerline A that passes through the center of gravity (center) of the cutting insert 10 and divides the cutting insert 10 into halves in a lateral direction (up-down direction in FIG. 6) Y when the cutting insert 10 is seen from the outer surface as illustrated in FIG. 6 is oriented.

As illustrated in FIG. 1 to FIG. 4, the cutting insert 10 has, for example, a plate-shaped body 20 elongated in one direction and having a substantially parallelogram shape.

The cutting insert 10 includes two cutting parts 21 protruding in opposite directions in the longitudinal direction X of the body 20.

The body 20 has an outer surface 30 and an inner surface 31 opposed to each other, side end surfaces 32 that are disposed on both sides of the body 20 in a lateral direction (direction perpendicular to longitudinal direction X and along fixing surface 80 described later (up-down direction in FIG. 5)) Y and that connect the outer surface 30 and the inner surface 31 to each other, and a screw hole 33 passing through the body 20 from the outer surface 30 toward the inner surface 31 in a thickness direction (direction perpendicular to both longitudinal direction X and lateral direction Y (left-right direction in FIG. 5)) Z. The two cutting parts 21 are provided at both ends of the body 20 in the longitudinal direction X.

As illustrated in FIG. 3, the cutting parts 21 have a substantially prism shape, for example, a quadrangular prism shape. The cutting part 21 has a cutting upper surface 40 serving as a rake surface, a cutting front surface 41 located on a front surface side (leading end side) of the cutting upper surface 40, a first cutting side surface 42 and a second cutting side surface 43 located on both sides of the cutting upper surface 40 in a thickness direction Z, and a bottom surface 44.

The cutting upper surface 40 has a substantially rectangular shape, and is smoothly continuous to the side end surfaces 32. As illustrated in FIG. 3 and FIG. 5, the cutting upper surface 40 is inclined with respect to the thickness direction Z so as to be closer to the bottom surface 44 as being closer to the first cutting side surface 42 located on the outer surface 30 side (toward outer direction Z2 in thickness direction Z).

The cutting front surface 41 has a substantially rectangular shape, for example, a substantially trapezoidal shape, and is connected to the front surface side of the cutting upper surface 40. At a connecting part of the cutting front surface 41 and the cutting upper surface 40, a connecting edge 50 is formed, and the connecting edge 50 forms a front cutting edge 51. The front cutting edge 51 is inclined with respect to the thickness direction Z similarly to the cutting upper surface 40. Note that an angle formed by the cutting front surface 41 and the cutting upper surface 40 is, for example, 90 degrees or less.

The first cutting side surface 42 is located on the outer surface 30 side of the cutting front surface 41, and is connected to the cutting upper surface 40 and the cutting front surface 41. The first cutting side surface 42 is inclined with respect to the lateral direction Y so as to be closer to the inner surface 31 as being more away from the cutting upper surface 40 (toward inner direction Z1 in thickness direction Z).

The second cutting side surface 43 is located on the inner surface 31 side of the cutting front surface 41, and is connected to the cutting upper surface 40 and the cutting front surface 41. The second cutting side surface 43 is inclined with respect to the lateral direction Y so as to be more away from the outer surface 30 as being more away from the cutting upper surface 40 (toward inner direction Z1 in thickness direction Z).

As illustrated in FIG. 3 and FIG. 6, the outer surface 30 of the body 20 has a first side surface part 70 including the first cutting side surface 42 of one of the cutting parts 21 and provided to extend in the longitudinal direction X, a second side surface part 71 including the first cutting side surface 42 of the other cutting part 21 and provided to extend in the longitudinal direction X, and a third side surface part 72 disposed between the first side surface part 70 and the second side surface part 71 and connecting the first side surface part 70 and the second side surface part 71 to each other.

In a plan view as seen from the thickness direction Z illustrated in FIG. 6, the first side surface part 70, the second side surface part 71, and the third side surface part 72 each have a substantially rectangular shape elongated in the longitudinal direction X, and are connected side by side in the lateral direction Y.

The first side surface part 70 and the second side surface part 71 have a curved shape that is curved along the lateral direction Y of the body 20 so as to project outward. As illustrated in FIG. 5, the first side surface part 70 and the second side surface part 71 have the curved surfaces having the same curvature in the plan view in the longitudinal direction X, but arc centers P1 and P2 of the curved surfaces do not match each other.

As illustrated in FIG. 3, FIG. 5, and FIG. 6, the third side surface part 72 has, for example, a flat shape. The screw hole 33 is mainly opened in the third side surface part 72.

As illustrated in FIG. 4, the inner surface 31 has a flat fixing surface 80 for fixing the cutting insert 10 to the tool body 11 of the cutting tool 1 and recessed parts 81 that are recessed with respect to the fixing surface 80.

The fixing surface 80 has a polygonal shape, and is formed at the center of the body 20 in the longitudinal direction X. The fixing surface 80 is a surface perpendicular to a central axis T of the screw hole 33. The fixing surface 80 has, at a part of its peripheral edge, inclined sides 90 that are inclined with respect to the lateral direction Y. The inclined sides 90 are provided on both sides of the screw hole 33.

The recessed parts 81 are provided on both sides of the fixing surface 80 in the longitudinal direction X. The recessed part 81 has a first wall surface 100 provided upright toward the inclined side 90 of the fixing surface 80, and a second wall surface 101 continuous to the first wall surface 100 and oriented in the lateral direction Y. For example, as illustrated in FIG. 5, in the plan view of the body 20 as seen from the longitudinal direction X, the second wall surface 101 is formed to be substantially parallel to the cutting upper surface 40 of the cutting part 21. Note that being "substantially parallel" only needs to be a state in which the cutting upper surface 40 and the second wall surface 101 are substantially parallel to each other without considering variation of a rake angle of the cutting upper surface 40 in the longitudinal direction X.

As illustrated in FIG. 3 and FIG. 6, the side end surfaces 32 face the both outer surfaces of the body 20 in the lateral direction Y. The side end surface 32 is provided to extend toward the longitudinal direction X, and has a smooth curved shape. The side end surface 32 is continuous from the cutting upper surface 40 of one of the cutting parts 21, and is extended to the bottom surface 44 of the other cutting part 21. The side end surface 32 has, in the vicinity of the recessed part 81, a recess (cutout) 110 that is recessed toward the center of the body 20 in the lateral direction Y (toward the other side end surface 32). Thus, for example, the side end surface 32 extends from the bottom surface 44 of one cutting part 21 in substantially parallel to the longitudinal direction X, is recessed at the recess 110, thereafter extends in substantially parallel to the longitudinal direction X, and is greatly recessed so as to approach the other side end surface 32 when approaching the cutting upper surface 40 of the other cutting part 21.

As illustrated in FIG. 6, in a plan view of the body 20 as seen from the outer surface 30, the body 20 is configured such that, when the body 20 is divided into halves by a central axis C passing through the center O of the body 20 in the longitudinal direction X and the lateral direction Y and extending in the lateral direction Y and when one half-body 20*a* of the body 20 is rotated by 180 degrees about the center O of the body 20, the half-body 20*a* matches the other half-body 20*b*.

Figure 7:
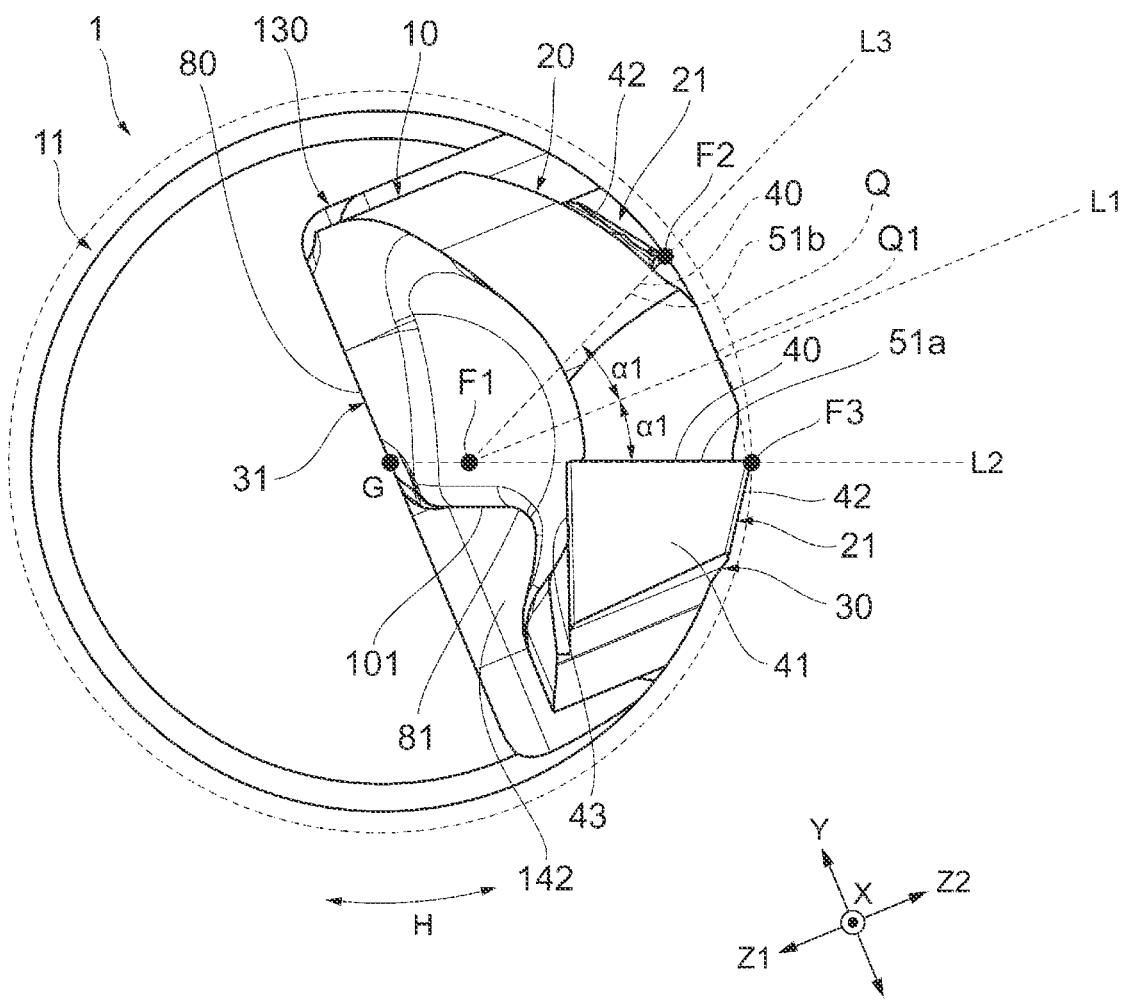
FIG. 7 is a view of the cutting insert mounted to a tool body as seen from a longitudinal direction (rotational axis direction)

In a projection view of the body 20 as seen from the longitudinal direction X illustrated in FIG. 7, the cutting upper surfaces 40 of the two cutting parts 21 are oriented in the lateral direction Y and opposed to each other. In the projection view of the body 20 as seen from the longitudinal direction X illustrated in FIG. 7, the two front cutting edges 51 become away from each other as being closer to the first cutting side surface 42 from the second cutting side surface 43. Note that FIG. 7 is a view in which the cutting insert 10 is mounted to the tool body 11, which is seen from the longitudinal direction X (direction along central axis G of tool body 11). In cutting, the cutting part 21 on the front side of the figure is used, and the cutting part 21 on the rear side is not used. In actuality, only parts of the cutting upper surface 40 and the front cutting edge 51*b* of the cutting part 21 not in use on the rear side are seen, and hence in FIG. 7, projected (perspective) positions of the cutting upper surface 40 and the front cutting edge 51*b* are indicated by dotted lines. A "projection view" is a view in which the cutting part 21 on the front side or the cutting part 21 on the rear side of the body 20 is seen by being projected from the longitudinal direction X.

In the projection view of the body 20 as seen from the longitudinal direction X, the two front cutting edges 51 are located on both sides of a virtual center line L1 (that matches central axis T in the present embodiment) passing through the center O of the body 20 in the lateral direction Y and extending in the thickness direction Z perpendicular to the lateral direction Y. The two front cutting edges 51 are disposed such that angles α1 with respect to the virtual center line L1 are the same.

Furthermore, a first front cutting edge 51*a* to be used of the two front cutting edges 51 has an outer end part F3 on the outer side of the tool body 11. In the projection view of the body 20 as seen from the longitudinal direction X, the first front cutting edge 51*a* is configured such that the central axis (axial center) G of the tool body 11 is located on a first virtual extended line L2 obtained by extending the first front cutting edge 51*a*.

In the projection view of the body 20 as seen from the longitudinal direction X, a virtual intersection F1 that intersects a second virtual extended line L3 obtained by extending a second front cutting edge 51*b* not in use is located on the first virtual extended line L2, and the virtual intersection F1 is located between the axial center G and the first front cutting edge 51*a*. The virtual intersection F1 is located at a position closer to the outer surface 30 than the fixing surface 80 of the inner surface 31 in the thickness direction Z. As a result, an outer end part F2 of the second front cutting edge 51*b* is located on the inner side of a circle Q around the axial center G passing through the outer end part F3 of the first front cutting edge 51*a*. The circle Q serves also as a minimum machining diameter of machining by the cutting tool 1. Note that, in the plan view of the body 20 as seen from the longitudinal direction X, the outer surface 30 is also located on the inner side of the circle Q.

As illustrated in FIG. 1 and FIG. 2, the tool body 11 has a cylindrical shape elongated in the direction of the central axis G, and includes, on its leading end side surface, a fixing part 130 for fixing the cutting insert 10.

The fixing part 130 has a depressed shape conforming to the shape of the cutting insert 10, and is configured such that the cutting insert 10 can be fitted in a state in which one of the cutting parts 21 of the cutting insert 10 protrudes from the leading end of the tool body 11.

Figure 8:
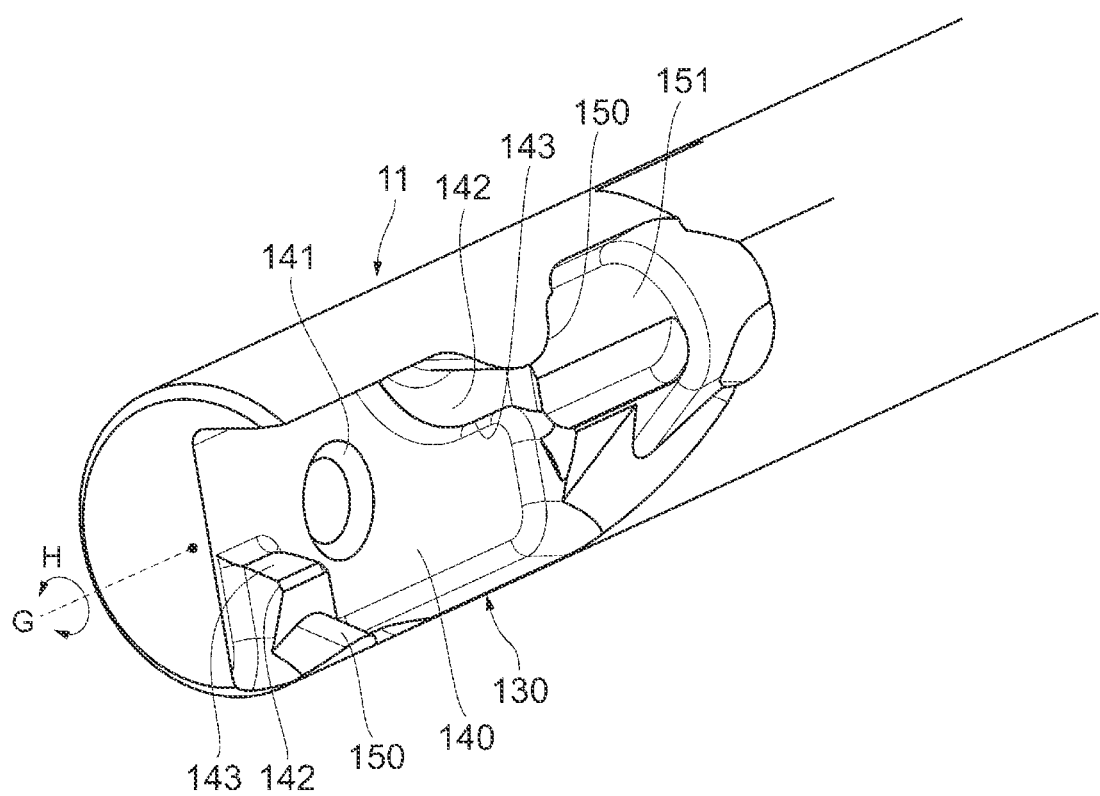
FIG. 8 is a perspective view illustrating a fixing part of the tool body.
Figure 9:
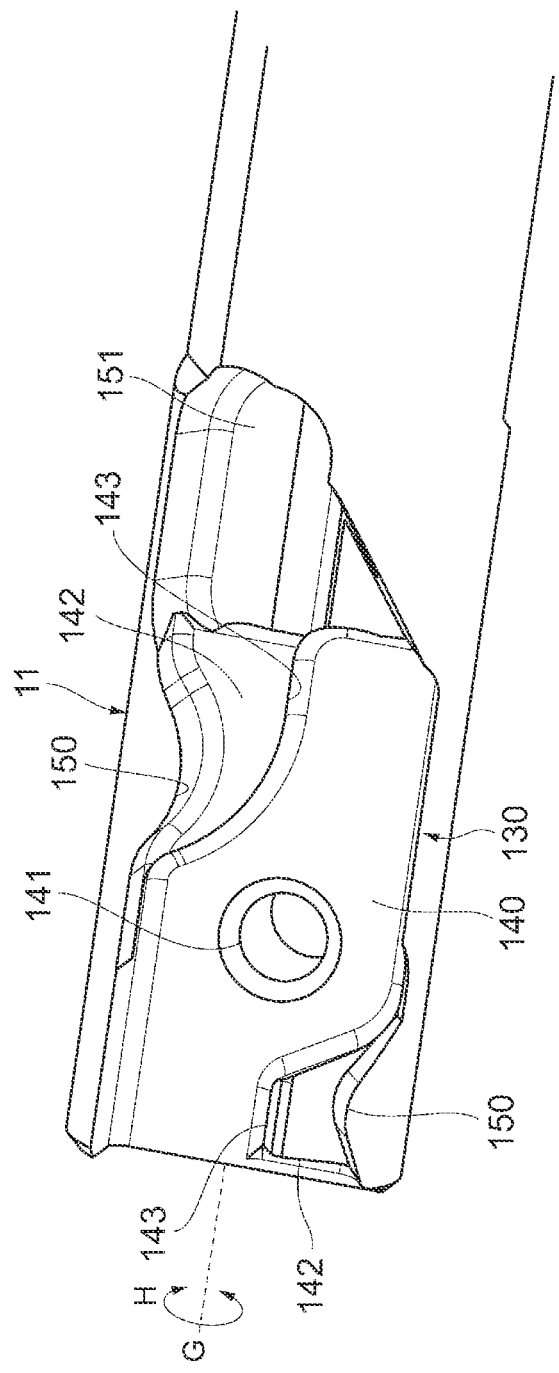
FIG. 9 is a perspective view illustrating a fixing part of the tool body.

As illustrated in FIG. 8 and FIG. 9, the fixing part 130 has a flat body fixing surface 140 to which the fixing surface 80 of the inner surface 31 of the cutting insert 10 contacts. The body fixing surface 140 is formed at the depressed shape bottom surface of the fixing part 130 so as to have the same shape as that of the fixing surface 80. At the center of the body fixing surface 140, a screw hole 141 is formed. On the fixing part 130, two projected parts 142 that can be fitted to the two recessed parts 81 of the inner surface 31 of the cutting insert 10 are formed. The projected part 142 has a support surface 143 parallel to the second wall surface 101 of the recessed part 81. The support surface 143 is oriented in a circumferential direction H about the central axis G of the tool body 11.

The fixing part 130 has, on its both side surfaces in the circumferential direction H around the central axis G of the depressed shape, two protruding parts 150 to be fitted to the recesses 110 of the side end surfaces 32 of the cutting insert 10. The protruding part 150 has a wave shape corresponding to a wave of the recess 110, and protrudes toward the center of the fixing part 130 in the circumferential direction H around the central axis G. Furthermore, the fixing part 130 has a housing part 151 for housing a cutting part 21 not in use. The housing part 151 is formed at a rear part of the fixing part 130.

As illustrated in FIG. 1, the cutting insert 10 is fitted into the fixing part 130 of the tool body 11 in a state in which the longitudinal direction X of the body 20 is oriented in the direction of the central axis G of the tool body 11 and one cutting part 21 to be used is oriented to the front of the tool body 11. In this case, the fixing surface 80 of the inner surface 31 of the cutting insert 10 contacts the body fixing surface 140 of the tool body 11, the recessed part 81 is fitted to the projected part 142, the recess 110 is fitted to the protruding part 150, and the other cutting part 21 not in use is fitted to the housing part 151. Either of the two cutting part 21 can be used, and irrespective of the cutting part 21 to be used, the same appearance is obtained when the cutting insert 10 is mounted to the tool body 11.

The screw 12 is inserted through the screw hole 33 and the screw hole 141, so that the cutting insert 10 is fixed to the tool body 11.

Figure 10:
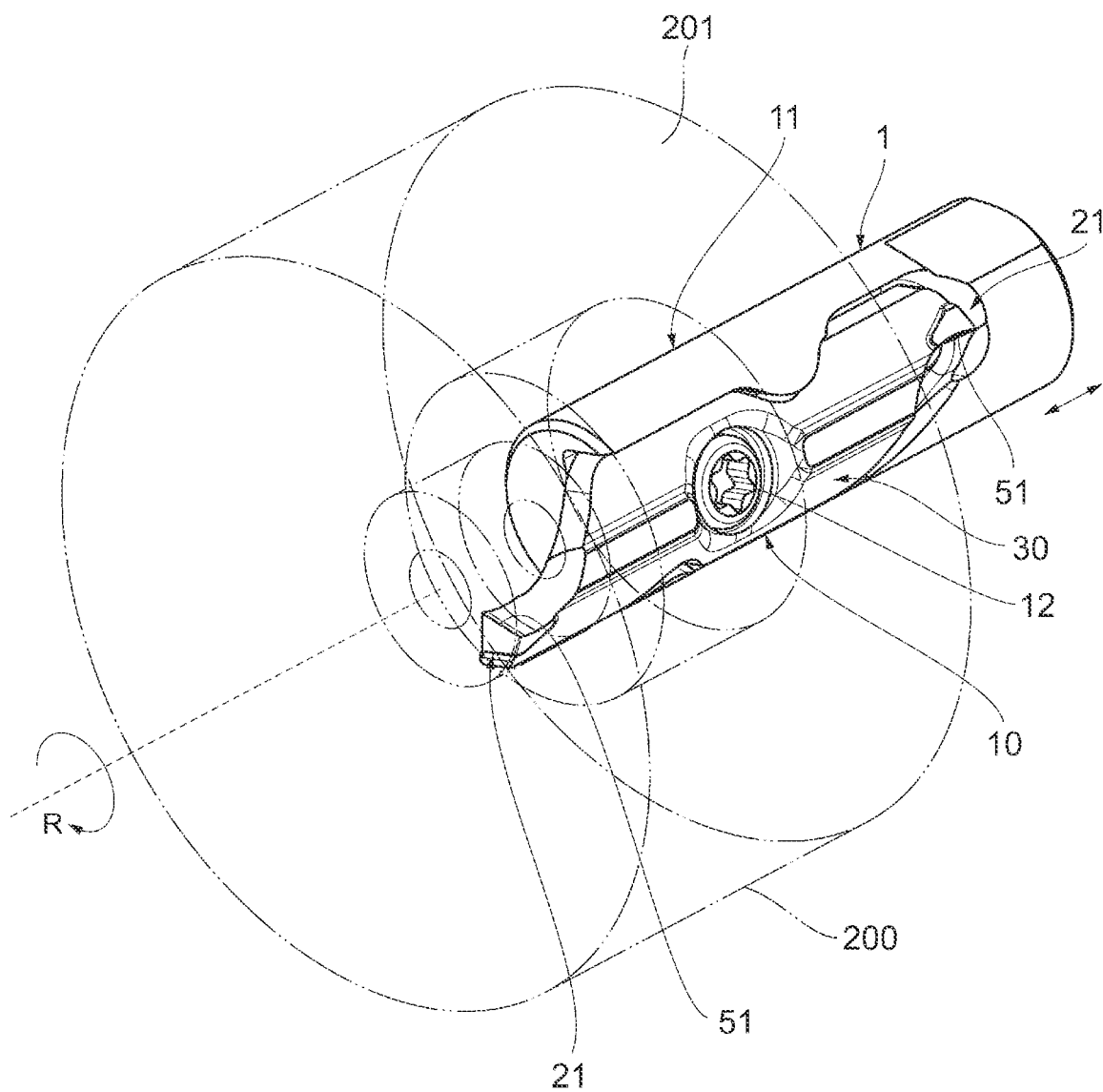
FIG. 10 is a schematic view illustrating a use state of a cutting tool.

The cutting tool 1 is used, for example, when a groove is formed in an end surface of a workpiece. In this case, as illustrated in FIG. 10, a workpiece 200 is rotated around the rotational axis R as a central axis, the tool body 11 of the cutting tool 1 is advanced toward an end surface 201 of the workpiece 200, one cutting part 21 of the cutting insert 10 is caused to enter the end surface 201 from a perpendicular direction, and the front cutting edge 51 is used to form a circular groove or a cylindrical hole in the end surface 201 of the workpiece 200. The peripheral wall surface (inner diameter surface) of the groove in the workpiece 200 is formed by the outer end part F3 of the front cutting edge 51 of the cutting part 21.

According to the present embodiment, as illustrated in FIG. 7, in the projection view of the body 20 as seen from the longitudinal direction X, the cutting upper surfaces 40 of the two cutting parts 21 of the cutting insert 10 are oriented in directions opposed to each other, and the front cutting edges 51a and 51b of the two cutting parts 21 are disposed so as to be more away from each other as being closer to the first cutting side surface 42 from the second cutting side surface 43. In this manner, the position of the virtual intersection F1 at which the first virtual extended line L2 obtained by extending the first front cutting edge 51a to be used and the second virtual extended line L3 obtained by extending the second front cutting edge 51b not in use intersect can be made closer to the first front cutting edge 51a. Consequently, deviation of loci of the circle Q centered around the central axis G and passing through the outer end part F3 of the first front cutting edge 51a and the circle Q1 centered around the virtual intersection F1 and passing through the outer end part F2 of the second front cutting edge 51b and the outer end part F3 of the first front cutting edge 51a increases, and as a result, the outer end part F2 of the second front cutting edge 51b is located on the more inner side of the circle Q. Thus, when one cutting part 21 is used, the other cutting part 21 does not interfere with the inner wall surface of a groove or a hole in the workpiece 200, and hence the cutting insert can enter the workpiece 200 more deeply. As long as the relation in which the outer end part F2 of the second front cutting edge 51b is located on the more inner side of the circle Q is maintained, the machining diameter of a groove or a hole in the workpiece 200 can be decreased, and hence the cutting insert can easily support machining of a groove or a hole having a small diameter in the workpiece 200.

As illustrated in FIG. 7, in a projection view of the body 20 as seen from the longitudinal direction X, the virtual intersection F1 at which the two front cutting edges 51 intersect when extended on the inner surface 31 side is located closer to the outer surface 30 than the fixing surface 80 of the inner surface 31. In this case, the position of the virtual intersection F1 is securely closer to the first front cutting edge 51a, and hence the outer end part F2 of the second front cutting edge 51b is located on the more inner side of the circle Q. Thus, the cutting insert can enter the workpiece 200 more deeply, and easily supports machining of a groove or hole having a small diameter in the workpiece 200.

In a projection view of the body 20 as seen from the longitudinal direction X, the two front cutting edges 51 are disposed on both sides of a virtual center line L1 extending in the thickness direction Z. In this manner, as illustrated in FIG. 7, for example, when the virtual center line L1 and the fixing surface 81 are orthogonal to each other, in a region below the first virtual extended line L2, the volume (cross-sectional area) of the cutting insert 10 can be suppressed to be low to increase the volume of a part where the tool body 11 holds the cutting insert 10. Thus, when cutting load is applied to the front cutting edge 51a, warpage of the tool body 11 holding the cutting insert 10 can be reduced, and as a result, machining precision can be improved.

In the projection view of the body 20 as seen from the longitudinal direction X, of the two front cutting edges 51, the first front cutting edge 51a is disposed such that an axial center G of the tool body 11 of the cutting tool 1 is located on a first virtual extended line L2 obtained by extending the first front cutting edge 51a. In this manner, the insert cross-sectional area located under the first front cutting edge 51a of the cutting part 21 to be used increases, and as a result, the strength of the cutting insert 10 for load applied in cutting can be improved. The width of a groove machined substantially matches the length of the front cutting edge 51a, and hence machining precision can be improved.

As illustrated in FIG. 7, in a projection view of the body 20 as seen from the longitudinal direction X, the virtual intersection F1 that intersects the second virtual extended line L3 obtained by extending the second front cutting edge 51b of the two front cutting edges 51 is located on the first virtual extended line L2, and the virtual intersection F1 is located at a position closer to the first front cutting edge 51a than the axial center G of the tool body 11. In this case, the position of the virtual intersection F1 is securely closer to the first front cutting edge 51a, and hence the outer end part F2 of the second front cutting edge 51b is located on the more inner side of the circle Q. Thus, the cutting insert can enter the workpiece 200 more deeply, and easily supports machining of a groove or hole having a small diameter in the workpiece 200.

The outer surface 30 has a first side surface part 70, a second side surface part 71, and a third side surface part 72, and the first side surface part 70 and the second side surface part 71 have a curved surface that is curved along the lateral direction Y of the body 20 so as to project outward. In this manner, an appropriate flank is formed on the outer surface 30 (outer surface side of two cutting parts 21) of the cutting insert 10.

In a plan view of the body 20 as seen from the longitudinal direction X as illustrated in FIG. 5, arc centers P1 and P2 of the curved surfaces of the first side surface part 70 and the second side surface part 71 do not match each other. In this manner, an appropriate flank is formed on the outer surface 30, and the machining diameter of a groove or a hole in the workpiece 200 can be decreased.

The third side surface part 72 has a flat surface, and hence the first side surface part 70 and the second side surface part 71 can be appropriately connected to secure a distance between the first side surface part 70 and the second side surface part 71. As a result, the positions of the arc centers P1 and P2 of the curved surfaces of the first side surface part 70 and the second side surface part 71 can be satisfactorily deviated from each other.

The screw hole 33 is opened in the third side surface part 72. In this manner, the screw hole 33 houses the head part of the screw 12 and its length in the thickness direction Z is not excessively long, and hence chips can be prevented from entering the screw hole 33.

The inner surface 31 has the recessed part 81 that is recessed from the fixing surface 80. In this manner, the recessed part 81 of the cutting insert 10 is fitted to the projected part 142, and hence the fixation of the cutting insert 10 and the tool body 11 can be enhanced.

In a plan view of the body 20 as seen from the longitudinal direction X, the recessed part 81 has the second wall surface 101 substantially parallel to the cutting upper surface 40 of the cutting part 21, and hence a surface oriented in the rotational direction R of the workpiece 200 is formed on the inner surface 31 of the cutting insert 10. As a result, the fixation strength of the cutting insert 10 for the tool body 11 due to load applied in cutting can be improved.

The body 20 has side end surfaces 32 located on both sides of the body 20 in the lateral direction Y and connecting the outer surface 30 and the inner surface 31 to each other, and the side end surface 32 has a recess 110 that is recessed on the center side of the body 20 in the lateral direction Y. In this manner, the recess 110 of the cutting insert 10 and the protruding part 150 of the tool body 11 can be fitted, and hence the cutting insert 10 can be prevented from being rotated with respect to the tool body 11 due to load applied in cutting.

As illustrated in FIG. 6, in a plan view of the body 20 as seen from the outer surface 30, when the body 20 is divided into halves by the central axis C passing through the center O of the body 20 and extending in the lateral direction Y of the body 20 and when one half-body 20a of the body 20 is rotated by 180 degrees around the center C of the body 20, the half-body 20a matches the other half-body 20b. Thus, irrespective of whether which of the two cutting parts 21 is mounted to the tool body 11 toward the leading end, the cutting tool 1 has the same structure, and the two cutting parts 21 can be satisfactorily used.

While the exemplary embodiments of the present invention have been described with reference to the accompanying drawings, the present invention is not limited to the examples. It is apparent that a person skilled in the art conceive of various kinds of changes and modifications within the concept of the idea as recited in the claims, and it should be understood that these changes and modifications pertain to the technical range of the present invention.

For example, the structures and shapes of the cutting insert 10 and the tool body 11 are not limited to the ones in the above-mentioned embodiments. For example, the shape of the cutting part 21 is not limited to the quadrangular prism or the rectangular solid in the above-mentioned embodiments. For example, the outer surface 30 of the cutting insert 10 is not necessarily required to be curved. The recessed part 81 and the recess 110 in the cutting insert 10 may be omitted. The present invention may be applied to a tool for rolling cutting, as well as a tool for turning.

The present invention enables a cutting insert having two cutting parts to enter a workpiece more deeply, and is useful for providing a cutting insert that easily supports machining of a groove or hole having a small diameter in a workpiece.

What is claimed is:

1. A cutting insert, comprising:
   a body including at least an inner surface to be fixed to a tool body of a cutting tool and an outer surface opposed to the inner surface, the body being elongated in one direction in a planar direction of the inner surface and the outer surface; and
   two cutting parts protruding in opposite directions in a longitudinal direction of the body, wherein
   each of the cutting parts has a substantially prism shape, and includes: a cutting upper surface serving as a rake surface; a cutting front surface located on a front surface side of the cutting upper surface and forming a connecting edge between the cutting front surface and the cutting upper surface; and a first cutting side surface and a second cutting side surface located on both sides of the cutting upper surface,
   the second cutting side surface is disposed on an inner surface side of the body, and the first cutting side surface is disposed on an outer surface side of the body,
   the connecting edge between the cutting upper surface and the cutting front surface has a front cutting edge formed thereon, and
   in a projection view of the body as seen from the longitudinal direction, the cutting upper surfaces of the two cutting parts are oriented in directions opposed to each other, and the two cutting parts have front cutting edges disposed so as to be more away from each other as being closer to the first cutting side surface from the second cutting side surface.

2. The cutting insert according to claim 1, wherein the inner surface includes a fixing surface for fixing the body to the tool body of the cutting tool, and in the projection view of the body as seen from the longitudinal direction, an intersection obtained by extending the two front cutting edges on the inner surface side is located at a position closer to the outer surface than the fixing surface of the inner surface.

3. The cutting insert according to claim 1, wherein, in the projection view of the body as seen from the longitudinal direction, the two front cutting edges are disposed on both sides of a virtual center line passing through a center of the body in a lateral direction and extending in a thickness direction perpendicular to the lateral direction.

4. The cutting insert according to claim 1, wherein, in the projection view of the body as seen from the longitudinal direction, a first front cutting edge of the two front cutting edges is disposed such that an axial center of the tool body of the cutting tool is located on a first virtual extended line obtained by extending the first front cutting edge.

5. The cutting insert according to claim 4, wherein, in the projection view of the body as seen from the longitudinal direction, a virtual intersection that intersects a second virtual extended line obtained by extending a second front cutting edge of the two front cutting edges is located on the first virtual extended line, and
the virtual intersection is located at a position closer to the first front cutting edge than the axial center of the tool body.

6. The cutting insert according to claim 1, wherein
the outer surface includes: a first side surface part including the first cutting side surface of one of the cutting parts and provided to extend in the longitudinal direction; a second side surface part including the first cutting side surface of the other cutting part and provided to extend in the longitudinal direction; and a third side surface part disposed between the first side surface part and the second side surface part and connecting the first side surface part and the second side surface part to each other, and
the first side surface part and the second side surface part each have a curved surface that is curved along a lateral direction of the body so as to project outward.

7. The cutting insert according to claim 6, wherein, in the plan view of the body as seen from the longitudinal direction, centers of the curved surfaces of the first side surface part and the second side surface part do not match each other.

8. The cutting insert according to claim 6, wherein the third side surface part includes a flat surface.

9. The cutting insert according to claim 6, wherein the third side surface part has a screw hole opened therein.

10. The cutting insert according to claim 1, wherein
the inner surface includes a fixing surface for fixing the body to the tool body of the cutting tool, and
the inner surface includes a recessed part that is recessed with respect to the fixing surface.

11. The cutting insert according to claim 10, wherein, in the plan view of the body as seen from the longitudinal direction, the recessed part includes a wall surface substantially parallel to the cutting upper surface of the cutting part.

12. The cutting insert according to claim 1, wherein
the body further includes side end surfaces located on both sides of the body in the lateral direction and connecting the outer surface and the inner surface to each other, and
the side end surface has a recess that is recessed toward a center of the body in the lateral direction.

13. The cutting insert according to claim 1, wherein, in a plan view of the body as seen from the outer surface, in a case where the body is divided into halves by a center line passing through a center of the body and extending in a lateral direction of the body and one half-body of the body is rotated by 180 degrees around the center of the body, the one half-body matches the other half-body.

14. A cutting tool, comprising:
the cutting insert according to claim 1; and
a tool body to which the cutting insert is fixed.

* * * * *